United States Patent
Shitsukawa

(10) Patent No.: US 8,690,448 B2
(45) Date of Patent: Apr. 8, 2014

(54) ROLLING BEARING DEVICE

(75) Inventor: Kenji Shitsukawa, Toyota (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 351 days.

(21) Appl. No.: 12/737,682

(22) PCT Filed: Aug. 4, 2009

(86) PCT No.: PCT/JP2009/063773
§ 371 (c)(1),
(2), (4) Date: Feb. 4, 2011

(87) PCT Pub. No.: WO2010/016470
PCT Pub. Date: Feb. 11, 2010

(65) Prior Publication Data
US 2011/0129178 A1 Jun. 2, 2011

(30) Foreign Application Priority Data
Aug. 5, 2008 (JP) .............. P2008-201987

(51) Int. Cl.
*F16C 13/00* (2006.01)
*F16C 35/00* (2006.01)

(52) U.S. Cl.
USPC ........................ 384/544; 384/589

(58) Field of Classification Search
USPC ....................... 384/544, 515, 589
See application file for complete search history.

(56) References Cited

U.S. PATENT DOCUMENTS

| | | | |
|---|---|---|---|
| 5,797,686 A * | 8/1998 | Kawamura et al. ......... | 384/544 |
| 5,803,617 A | 9/1998 | Ohnuki et al. | |
| 6,224,265 B1 * | 5/2001 | Enomoto ....................... | 384/505 |
| 8,256,967 B2 * | 9/2012 | Langer et al. ................. | 384/544 |
| 2002/0061152 A1 | 5/2002 | Muschiol et al. | |
| 2005/0069238 A1 | 3/2005 | Ueno et al. | |
| 2009/0038414 A1 | 2/2009 | Ozaki et al. | |

FOREIGN PATENT DOCUMENTS

| | | |
|---|---|---|
| EP | 1 010 546 A | 6/2000 |
| EP | 1 843 055 A1 | 10/2007 |
| JP | 9-287619 A | 11/1997 |
| JP | 2000-177301 A | 6/2000 |
| JP | 2004-36818 A | 2/2004 |
| JP | 2007-155079 A | 6/2007 |
| JP | 2008-121840 A | 5/2008 |
| JP | 2008-162356 A | 7/2008 |
| WO | WO 2007/066593 A1 | 6/2007 |

OTHER PUBLICATIONS

Chinese Office Action dated Sep. 17, 2012, with English translation.
European Search Report dated Mar. 14, 2012.

* cited by examiner

*Primary Examiner* — Richard W Ridley
*Assistant Examiner* — Yamilka Pinero Medina
(74) *Attorney, Agent, or Firm* — McGinn IP Law Group, PLLC

(57) ABSTRACT

There is provided a rolling bearing apparatus which can more disperse stress which concentrates on a root portion of a flange portion formed on an outer circumferential surface of an outer ring as compared with a related art. In a rolling bearing apparatus 1, a surface which continues from a vehicle outer side end face 220 of an outer ring flange portion 22 to an outer circumferential surface 210 of an outer ring main body portion 21 is formed to have a smoothly continuing curved surface 200, and a protruding curved surface 203 which protrudes radially outwards is formed on a part of the curved surface 200.

9 Claims, 3 Drawing Sheets

US 8,690,448 B2

ROLLING BEARING DEVICE

TECHNICAL FIELD

The present invention relates to a rolling bearing apparatus.

BACKGROUND ART

A hub unit for a vehicle exists, e.g., as disclosed in Patent Document 1. Generally, in a hub unit, a fixing member to be fixed to a vehicle body is mounted on an outer ring member, and a wheel is mounted on an inner ring member. As shown in FIG. 3, such a hub unit may be configured such that an outer ring member 2 includes an outer ring flange portion 22 formed to protrude from an outer circumferential surface thereof so as to contact a fixing member 9 of a vehicle body in an axial direction.

RELATED ART DOCUMENTS

Patent Documents

Patent Document 1: JP-A-2000-177301

SUMMARY OF THE INVENTION

Problem to be Solved by the Invention

In view of various reasons such as a restriction on the axial dimension of a hub unit, a width of a bearing has been reduced. However, it is revealed that when the outer ring flange portion formed on the outer circumferential surface of the outer ring member is located close to a raceway surface formed on an inner circumferential surface of the outer ring member, stress is likely to concentrate on a root portion of the flange portion. This stress is considered to be produced by the outer ring which is pressed outwards by rolling elements when the bearing apparatus is driven. In the related art, although this root portion is formed as a simple arc surface in a radius of curvature of 5 to 10 mm, there is a need for the outer ring member having a shape with a higher withstanding performance against stress in view of the above-described circumstances.

An object of the invention is to provide a rolling bearing apparatus which can more disperse stress concentrating on a root portion of a flange portion formed on an outer circumferential surface of an outer ring as compared with the related art.

Means for Solving the Problem

In order to solve the problem, there is provided a rolling bearing apparatus comprising an outer ring member mounted on a vehicle fixing member of a vehicle inner side so as not to rotate, an inner ring member mounted on a wheel side and disposed concentrically with the outer ring member, and rolling elements interposed between the inner ring member and the outer ring member, wherein the outer ring member includes a cylindrical outer ring main body portion having a raceway surface for the rolling elements formed on an inner circumferential surface thereof and an outer ring flange portion which protrudes radially outwards from the main body portion, and wherein a surface continuing from a vehicle outer side end face of the outer ring flange portion to an outer circumferential surface of the outer ring main body portion is formed as a curved surface which continues smoothly, and a protruding curved surface which protrudes radially outwards is formed on the curved surface.

According to the configuration of the invention, since the smoothly continuing curved surface is formed at a corner portion at a root of the outer ring flange portion which protrudes from the outer circumferential surface of the outer ring member, stress from the rolling elements can be dispersed effectively. In addition, since the protruding portion which protrudes outward is formed in the middle of the curved surface, the withstanding performance against stress is increased at the root portion of the outer flange portion, whereby an extremely long life of the outer ring member can be obtained.

The curved surface formed at the corner portion of the root of the outer ring flange portion may include: an inner side arc surface which continues from the vehicle outer side end face of the outer ring flange portion on the vehicle inner side and which has a predetermined radius of curvature such that a curvature center is situated at a position radially outwards from the outer ring main body portion; and an outer side arc surface which continues from the outer circumferential surface of the outer ring main body portion on a vehicle outer side and which has a predetermined radius of curvature such that a curvature center is situated at a position radially outwards from the outer ring main body portion. In this case, the protruding curved surface may be formed to have a protruding arc surface which continues from both the inner side arc surface and the outer side arc surface and which has a predetermined radius of curvature a such that curvature center is situated at a position further radially inwards than the outer circumferential surface of the outer ring main body portion. According to this configuration, the surface continuing from the vehicle outer side end face of the outer ring flange portion to the outer circumferential surface of the outer ring main body portion is formed to have a plurality of arc surfaces which continue smoothly. In addition, since the surface is formed to have the plurality of arc surfaces, a shape thereof becomes simple, and hence, an advantage can be obtained that the production is facilitated. In addition, the radius of curvature of the protruding curved surface (the protruding arc surface) is set larger than the radii of curvatures of the outer side arc surface and the inner side arc surface, whereby the curved surface is restrained from protruding radially outwards of the outer ring main body portion, and hence, the effect on a structure disposed in the space is reduced.

The inventor of the invention finds that a larger stress dispersion effect can be obtained by setting the radius of curvature of the outer side arc surface smaller than the radius of curvature of the inner side arc surface. Specifically, in a case where the radius of curvature of the outer side arc surface is set to 2 mm, the radius of curvature of the inner side arc surface is set to 10 mm and the radius of curvature of the protruding curved surface (the protruding arc surface) is set to 20 mm, about 20% reduction of the stress exerted on the root portion of the outer ring flange portion can be confirmed as compared with the related art rolling bearing apparatus.

Incidentally, the curved surface can be provided in a position intersecting with a straight contact line which connects a contact center point of the rolling element with respect to the raceway surface of the outer ring main body portion to a center position of the rolling element. Since the rolling element and the raceway surface are basically designed so as to point contact each other, the rolling element transmits stress towards the contact point with the raceway surface. The stress exerted by the rolling element can effectively be dispersed by providing the curved portion on an extension thereof, and the withstanding performance against stress of the outer ring member is increased, whereby an extremely long life of the outer ring member can be obtained.

In a vehicle hub unit, the contact center point is situated closer to a vehicle outer side than an intersection point where a straight line extending radially outwards from the center position of the rolling element intersects with the raceway surface. With this configuration, when a force is exerted on the outer ring member 2 and the inner ring member 3 in an axial direction, the outer ring member 2 and the inner ring member 3 can resist the exerted axial force.

In addition, the curved surface can be provided in a position where the curved surface overlaps with the raceway surface of the outer ring main body portion on a projection plane on which the curved surface and the raceway surface of the outer ring main body portion are projected in a radial direction. As the raceway surface is provided closer to the curved surface, the outer ring flange portion is provided closer to the raceway, whereby stress is likely to concentrate on the root portion of the outer ring flange portion. However, the stress exerted from the rolling element can effectively be dispersed by providing the curved portion described above, whereby the withstanding performance against the stress of the outer ring member is improved, whereby an extremely long life of the outer ring member can be obtained.

A hub unit of the invention includes the rolling bearing apparatus. The inner ring member includes: a hub wheel which is disposed concentrically with the outer ring member and which rotates together with a wheel mounted thereon; and an inner ring which is securely fitted at least on an outer circumferential surface of a vehicle inner side end portion of the hub wheel. The rolling elements are arranged into two rows. One of the rows is a vehicle inner side rolling element row including a plurality of rolling elements arranged between the inner ring and the outer ring member in a circumferential direction. The other of the rows is a vehicle outer side rolling element row including a plurality of rolling elements arranged between the hub wheel and the outer ring member in the circumferential direction. The outer ring flange portion is provided closer to the vehicle inner side rolling element row than the vehicle outer side rolling element row in an axial direction. The same advantage as that obtained by the rolling bearing apparatus can also be obtained by the hub unit having the configuration as described above.

Advantages of the Invention

According to the invention, since the smoothly continuing curved surface is formed at the corner portion of the root of the outer ring flange portion which protrudes from the outer circumferential surface of the outer ring member, the stress exerted from the rolling elements can effectively be dispersed. In addition, since the protruding portion which protrudes outwards is formed in the middle of the curved surface, the withstanding performance against the stress is improved at the root portion of the outer ring flange portion, whereby an extremely long life of the outer ring member can be obtained.

MODE FOR CARRYING OUT THE INVENTION

Hereinafter, an embodiment of the invention will be described by reference to the drawings.

Figure 1:
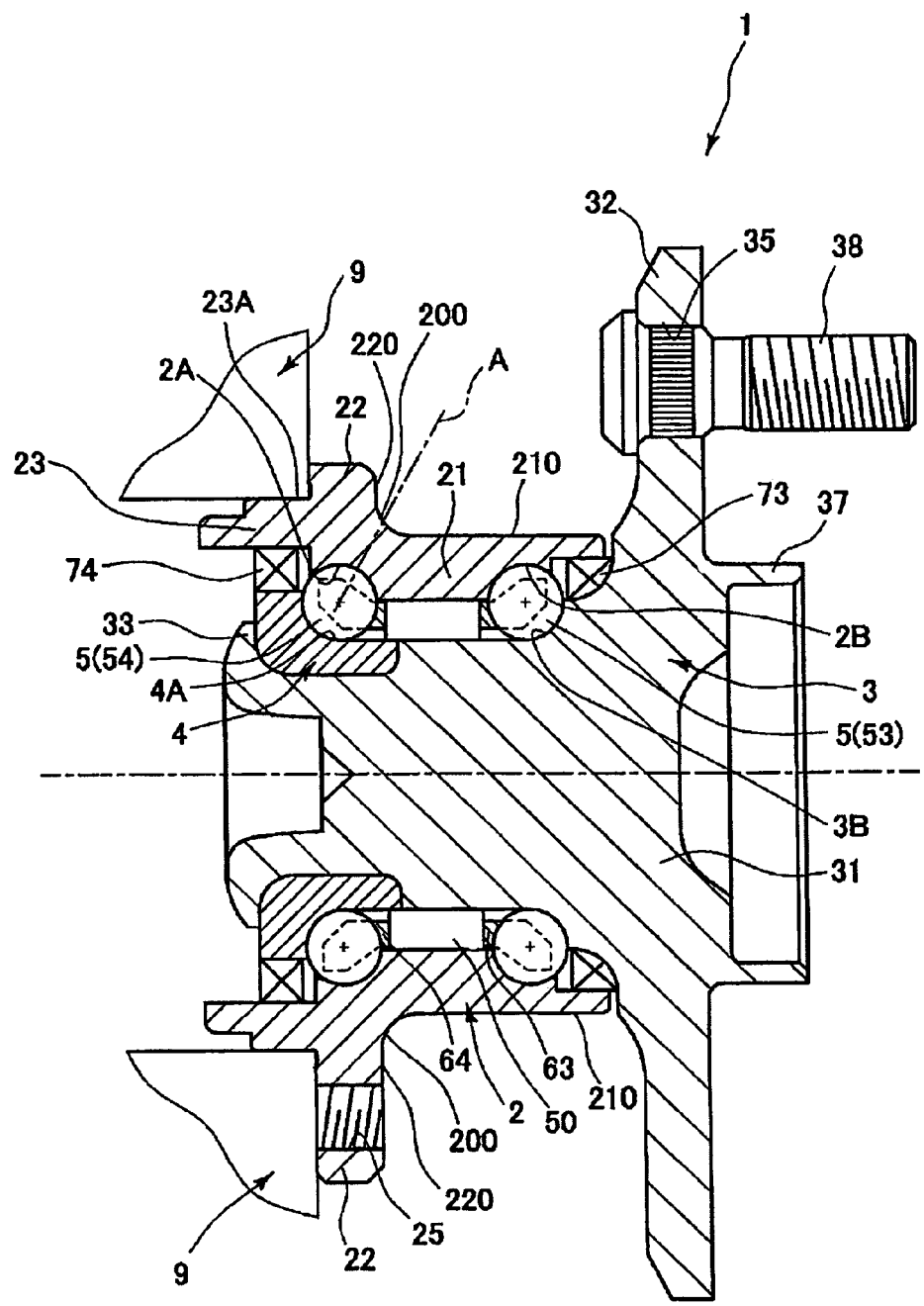
FIG. 1 is a sectional view showing one embodiment of a hub unit according to the invention.

FIG. 1 is a sectional view of a hub unit (a rolling bearing apparatus) 1 of this embodiment. In FIG. 1, the right side corresponds to a vehicle outer side, and a left side corresponds to a vehicle inner side. As is shown in FIG. 1, the hub unit 1 includes: an outer ring member 2 constituting a fixed ring; and an inner ring member 3, 4. The hub unit 1 forms an angular contact ball bearing apparatus having double rows which include rolling elements and which are arranged in an axial direction.

The outer ring member (hereinafter referred to simply as the outer ring) is made of a carbon steel by hot forging and includes a cylindrical outer ring main body portion 21, an outer ring flange portion 22 and an outer ring spigot portion 23. On an inner circumferential surface of the cylindrical outer ring main body portion 21, raceway surfaces 2A, 2B for rolling elements 5 are formed. The outer ring flange portion 22 protrudes radially outwards from the outer ring main body portion 21. The outer ring spigot portion 23 is formed in a cylindrical shape at a position closer to a vehicle inner side than the outer ring flange portion 22 so as to protrude radially outwards from the outer ring main body portion 21. The outer ring spigot portion 23 has an outer circumferential surface 23A defining a mounting portion to be mounted to a vehicle fixed member 9 such as a carrier or a knuckle (i.e., a mounting portion to a vehicle body). The hub unit 1 is fixed to the vehicle body side by the process as follows: positioning the hub unit 1 with respect to the vehicle body by use of the outer ring spigot portion 23; and inserting a bolt through a bolt insertion hole 25 in the outer ring flange portion 22 such that the outer ring member 2 is fixed. The outer ring flange portion 22 of this embodiment is provided so that a radial axis of a vehicle outer side end face 220 of the outer ring flange portion 22 is situated between two planes S1, S2 which are perpendicular to an axial direction and which pass through rolling element center positions O of the rolling elements 5 of the respective rolling element rows which are situated on the vehicle inner side and the vehicle outer side, respectively.

The hub wheel 3 constituting the inner ring member includes a shaft portion 31 and a hub flange 32 to which a wheel and a disc brake are fixed. The hub flange 32 is formed so as to protrude radially outwards from a vehicle outer side end portion of the shaft portion 31. A rolling element row 53 including the plurality of rolling elements 5, is interposed between the hub wheel 3 and the outer ring member 2, and a raceway surface (a vehicle outer side raceway surface) 3B for the rolling element row 53 is formed on an outer circumferential surface of the shaft portion 31.

An insertion hole 35 for receiving a hub bolt 38 is formed in a predetermined position of the hub flange 32. In addition, a guide portion (spigot portion) 37 is formed on a vehicle outer side main surface of the hub flange 32 so as to protrude therefrom towards the vehicle outer side, and functions to position a brake disc rotor and a wheel (not shown) when the brake disc rotor and the wheel are mounted on the hub flange 32. The disc brake rotor and the wheel are fixed to the hub flange 32 by the process as follows: positioning the brake disc rotor and the wheel by the spigot portion 37; inserting the hub bolt 38 through the insertion hole 35; and screwing a nut on the hub bolt 38.

The inner ring 4 constituting the inner ring member is press fitted to the shaft portion 31 of the hub wheel 3 from a vehicle inner end of the shaft portion 31 and is clamped to be fixed by a clamping portion 33. A rolling element row 54 including the plurality of rolling elements 5 is interposed between the inner ring 4 and the outer ring member 2, and a raceway surface (a vehicle inner side raceway surface) 4A for the rolling element row 54 is formed on an outer circumferential surface of the inner ring 4.

A cylindrical space (a rolling elements disposing space) is formed between the outer ring member 2 and the inner ring member 3, 4. The rolling element rows 54, 53 are disposed at a vehicle outer side and a vehicle inner side of the space 50, respectively. In addition, seal members 74, 73 are provided at positions axially outer side than the rolling element rows 54, 53, respectively.

The rolling elements 5 belonging to the rolling element rows 54, 53 are held by cases 64, 63, respectively. The rolling elements 5 belonging to the rolling element rows 54, 53 are disposed so as be held between the vehicle inner side raceway surfaces 2A, 4A and the vehicle outer side raceway surfaces 2B, 3B of the outer ring member 2 and the inner ring member 3, 4, respectively. However, the individual rolling elements 5 are basically designed so as to point contact the raceway surfaces 2B, 3B, 2A, 4A and have a different diameter from those of the raceway surfaces (there are possibilities that the rolling elements 5 surface contact the corresponding raceway surfaces due to plastic deformation such as wear).

Contact center points P of the rolling elements 5 with respect to the raceway surfaces 2B, 3B, 2A, 4A (although the contact center points P are basically considered to coincide with the positions where the rolling elements 5 point contact the raceway surfaces, it is considered that there will be possibilities that the contact center points P come to deviate from the point contact positions with time) do not exist on sectional planes S but are situated on inclined imaginary straight lines (straight contact lines). The sectional plane S is perpendicular to the axial direction and passes through the center positions O of the rolling element 5. The imaginary straight line extends radially outwards from an axial axis so as to be inclined axially inwards toward the radial outside (inclined closer to the other rolling element row). With this configuration, when not only a radial force but also an axial force is exerted on the outer ring member 2 and the inner ring member 3, 4, the outer ring member 2 and the inner ring member 3, 4 can resist those forces. As used herein, a contact angle is defined as an angle formed by the sectional plane S perpendicular to the axial direction and passing through the rolling element center position O and a plane passing through the rolling element center position O and the contact center point P.

In the invention, the outer ring flange portion 22 is provided in a position closer to the vehicle inner side rolling element row than the vehicle outer side rolling element row 53 in the axial direction. Therefore, the outer ring flange portion 22 formed on the outer circumferential surface of the outer ring member 2 is positioned close to the raceway surface 2A formed on an inner circumferential surface of the outer ring member 2, and hence stress is likely to concentrate on a root portion of the outer ring flange portion 22. This is a phenomenon produced by the outer ring member 2 which is pressed outwards by the rolling elements 5 of the rolling element row 54.

Figure 2:
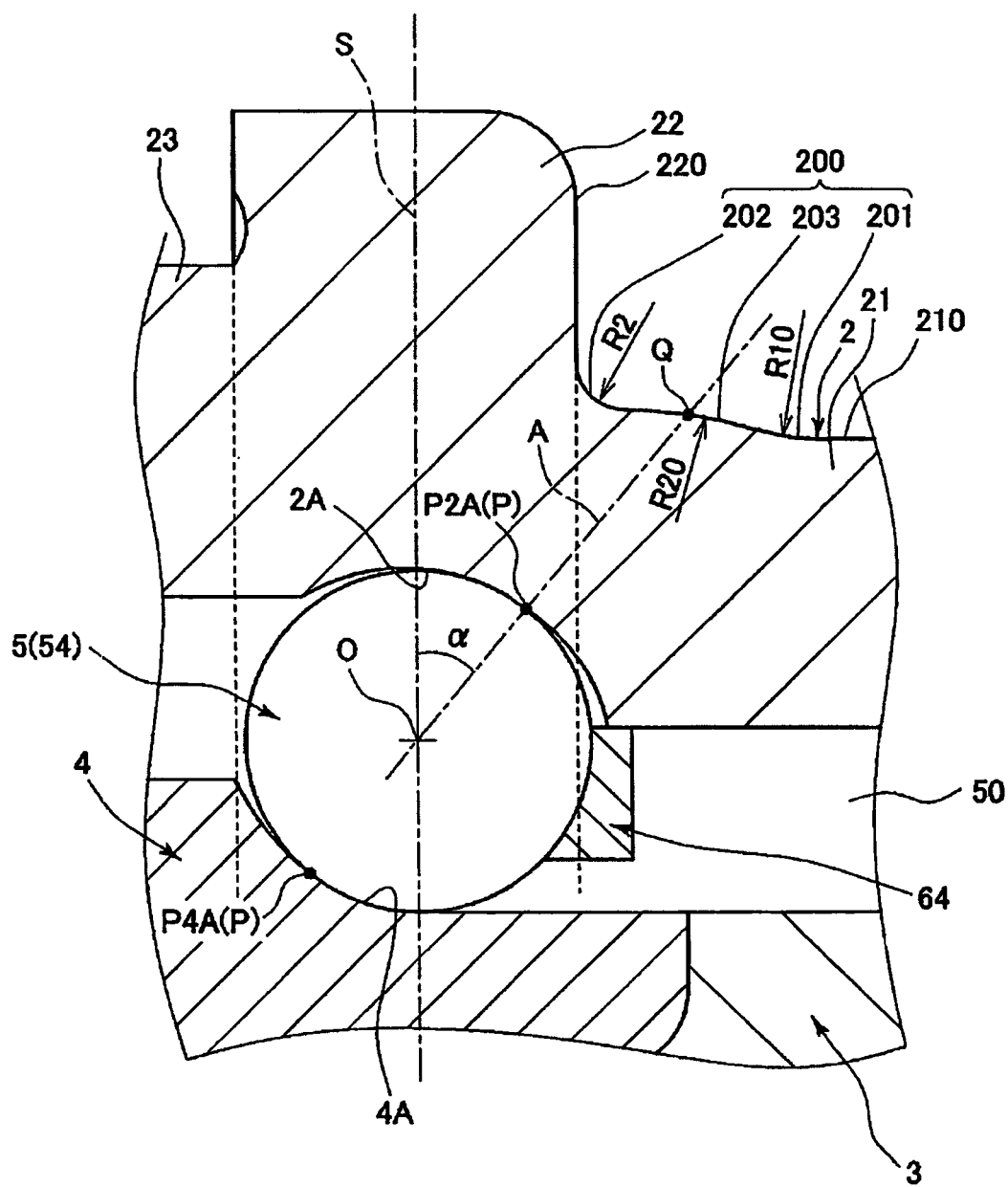
FIG. 2 is an enlarged view of a main part of FIG. 1.

In particular, in FIG. 2, a vehicle outer side root portion (corner portion) of the outer ring flange portion 22 overlaps with the vehicle inner side raceway surface 2A of the outer ring main body portion 21 on a projection plane on which the vehicle outer side root portion of the outer ring flange portion 22 and the vehicle inner side raceway surface 2A are projected in a radial direction. In this case, the vehicle outer side root portion (corner portion) of the outer ring flange portion 22 is positioned extremely close to the vehicle inner side raceway surface 2A of the outer ring main body portion 21. Consequently, stress is likely to concentrate on the root portion, and plastic deformation is likely to occur at the root portion, thereby resulting in a reduction in life of the outer ring member.

Further, in this embodiment, as shown in FIG. 2, the vehicle outer side root portion (corner portion) of the outer ring flange portion is situated in a position which intersects with a straight contact line A. The straight contact line A connects the contact center position P2A (P) of the rolling element 5 to the raceway surface 2A of the outer ring main body portion 21 to the center position O of the rolling element 5. That is, an intersection point Q intersecting with the straight contact line A exists on an outer circumferential surface 200 of the root portion. Since the rolling element 5 and the raceway surface 2A are basically designed so as to point contact each other, the rolling element 5 disposed on the raceway surface 2A transmits stress towards the contact point P2A with respect to the raceway surface 2A (that is, in the direction of the straight contact line A). Therefore, when the vehicle outer side root portion (corner portion) of the outer ring flange portion 22 described above is provided on an extension of the direction to transmit the force, stress is likely to concentrate on that portion, and plastic deformation is likely to occur at the root portion, thereby resulting in a reduction in life of the outer ring member 2.

In order to suppress the stress concentration described above, as shown in FIG. 2, in the hub unit 1 of the invention, the surface 200 continuing from the vehicle outer side end face 220 of the outer ring flange portion 22 to an outer circumferential surface 210 of the outer ring main body portion 21 is formed as a smoothly continuing curved surface, and a protruding curved surface 203 protruding radially outwards is formed on the curved surface 200 for reinforcement. In particular, the reinforcement effect becomes the largest when the intersection point Q exists on the protruding curved surface 203.

As means for preventing the deformation resulting from the stress concentration on the root portion, the thickness of the root portion is usually increased. However, increase in the thickness in the way described prevents a reduction in weight of the hub unit. In contrast, in the invention, as described above, the location where stress is likely to concentrate is identified (for example, the intersection point Q), and the protruding curved surface is formed in the vicinity of the identified location. With this configuration, since stress is difficult to concentrate at locations other than the identified location, it is possible to reduce outside diameters of the locations other than the location where stress is likely to concentrate, and also possible to increase inside diameters of the locations other than the location where stress easily concentrates. As a result, the thickness thereof can be reduced, whereby it is possible to reduce at least the thickness of the outer ring member as a whole, and also possible to reduce the weight of the hub unit.

In this embodiment, the curved surface 200 formed at the corner portion serving as the root of the outer ring flange portion 22 (i.e., the vehicle outer side corner portion) includes an inner side arc surface 202, an outer side arc surface 201 and the protruding curved surface 203. The inner side arc surface 202 serves as a surface continuing from the vehicle outer side end face 220 of the outer ring flange portion 22 on the vehicle inner side and has a predetermined radius of curvature such that a curvature center is determined on a radially outer side of the outer ring main body portion 21. The outer side arc surface 201 serves as a surface continuing from the outer circumferential surface 210 of the outer ring main body portion 21 on the vehicle outer side and has a predetermined radius of curvature such that a curvature center is determined on a radially outer side of the outer ring main body portion 21. The protruding curved surface 203.

The protruding curved surface 203 is formed between the inner side arc surface 202 and the outer side arc surface 201 as a surface which continues from both the arc surfaces. Further, the protruding curved surface 203 is formed as a protruding arc surface having a predetermined radius of curvature such that a center of curvature is determined on a radially inner side of the outer circumferential surface 210 of the outer ring main body portion 21.

In the embodiment, the radius of curvature of the outer side arc surface 201 is set smaller than the radius of curvature of the inner side arc surface 202, whereby a larger stress dispersion effect is obtained. Further, the radius of curvature of the protruding curved surface (the protruding arc surface) 203 is set larger than the radii of curvatures of the outer side arc surface 201 and the inner surface arc surface 202. With this configuration, a radially outward protruding amount of an entire of the curved surface 200 is suppressed, whereby the protruding curved surface 203 is formed to have a shape hardly to affect a structural object disposed in a space located on a radially outer side of the curved surface 200.

Figure 3:
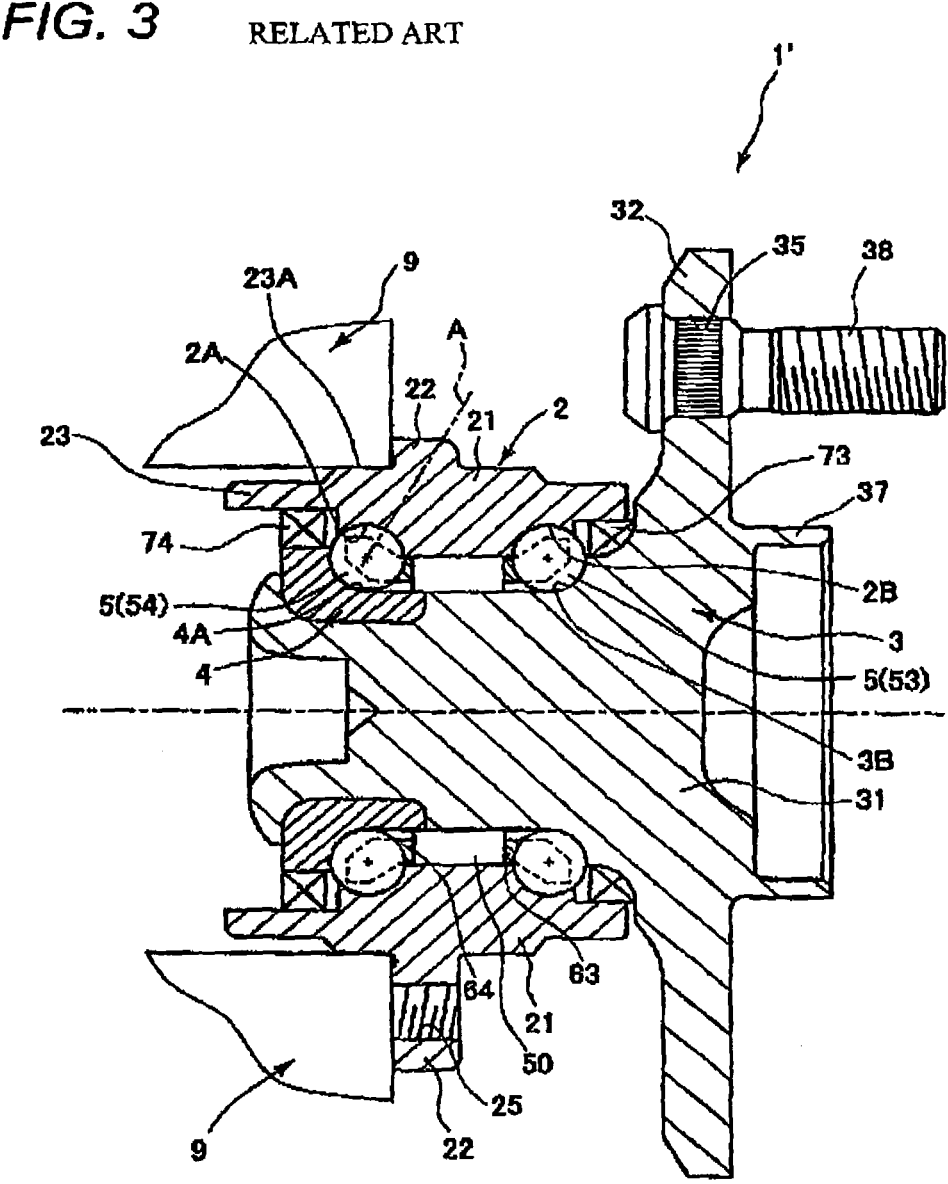
FIG. 3 is a sectional view showing a conventional hub unit.

Specifically, in the embodiment, the radius of curvature of the outer side arc surface 201 is 2 mm, the radius of curvature of the inner side arc surface 202 is 10 mm, and the radius of curvature of the protruding curved surface (the protruding arc surface) 203 is 20 mm, whereby the stress exerted on the root portion of the outer ring flange portion 22 is reduced about 20% as compared with the related art shown in FIG. 3. It should be noted that the surface configuration of the curved surface 200 (201, 202, 203) shown in FIG. 2 is illustrated to emphasize the protruding configuration. Therefore, the surface configuration is not illustrated to reflect the above values, and in reality, the protruding amount is small. That is, according to the invention, the stress exerted on the root portion of the outer ring flange portion 22 can effectively and largely be dispersed by a extremely slightly change in the surface configuration. Thus, even when a structure object exists on a radially outer side of the curved surface 200, the curved surface 200 hardly affects the structure.

While the embodiment of the invention has been described above, the embodiment merely illustrates the example thereof. The present invention is not limited to the embodiment, and various changes may be made without departing from the spirit and scope of the invention.

For example, when the protruding portion (the outer ring flange portion) protruding from the outer circumferential surface of the outer ring member 2 is provided, so long as a curved surface as described above is formed at least at the root portion of the outer ring member 2, advantages of dispersing the stress from the inside of the outer ring member 2 can be obtained, whereby the root portion of the outer ring member 2 can be reinforced. Further, in the case of the structure in which stress exerted from the rolling elements is more likely to concentrate at the root portion of the protruding portion (the outer ring flange portion), the above curved surface configuration becomes particularly preferable.

It is a matter of course that various changes may be made without departing from the spirit and scope thereof. While the invention has been described in detail with reference to the specific embodiment, those skilled in the art will appreciate that various changes or modification may be made without departing from the spirit or scope of the invention or the scope of the intention.

The invention is based on Japanese Patent Application (Application No. 2008-201987) filed on Aug. 5, 2008, the contents of which are incorporated herein by reference.

INDUSTRIAL APPLICABILITY

According to the invention, the withstanding performance against stress at the root portion of the outer ring flange portion can be increased to thereby realize an extremely long life of the outer ring member.

DESCRIPTION OF REFERENCE SYMBOLS 1 hub unit
2 outer ring (outer ring member)
2A, 2B raceway surface
21 outer ring main body portion
210 outer circumferential surface of outer ring main body portion
22 outer ring flange portion
220 vehicle outer side end face of outer ring flange portion
200 curved surface
201 outer side arc surface
202 inner side arc surface
203 protruding curved surface (protruding arc surface)
4 inner ring
5 rolling element
P1 contact center point
O rolling element center position
A straight contact line
$\alpha$ contact angle

The invention claimed is:
1. A rolling bearing apparatus comprising:
an outer ring member mounted on a vehicle fixing member of a vehicle inner side so as not to rotate, the outer ring comprising:
a cylindrical outer ring main body portion which has an outer circumferential surface and an inner circumferential surface and in which a raceway surface is formed on the inner circumferential surface; and
an outer ring flange portion which has a vehicle outer side end face and protruding radially outwards from the outer ring main body portion;
an inner ring member mounted on a wheel side and disposed concentrically with the outer ring member; and
a rolling element row comprising rolling elements arranged in a circumferential direction on the raceway surface between the inner ring member and the outer ring member,
wherein a surface continuing from the vehicle outer side end face to the outer circumferential surface is formed as a smoothly continuing curved surface,
wherein a protruding curved surface which protrudes radially outwards is formed on the curved surface,
wherein the protruding curved surface comprises a protruding arc surface having a predetermined radius of curvature such that a curvature center is positioned further radially inwards than the outer circumferential surface of the outer ring main body portion,
wherein the continuing curved surface comprises:
an inner side arc surface which serves as a surface continuing from the vehicle outer side end face of the outer ring flange portion on the vehicle inner side and which has a predetermined radius of curvature such that a curvature center is determined on a radially outer side of the outer ring main body portion;
an outer side arc surface which serves as a surface continuing from the outer circumferential surface of the outer ring main body portion on the vehicle outer side and which has a predetermined radius of curvature such, that a curvature center is determined on a radially outer side of the outer ring main body portion; and the protruding curved surface, and wherein the radius of curvature of the protruding curved surface is set larger than the radii of curvatures of the outer side arc surface and the inner side arc surface.

2. The rolling bearing apparatus according to claim 1, wherein the curved surface is provided in a position intersecting with a straight contact line which connects a contact center point of the rolling element with respect to the raceway surface of the outer ring main body portion to a center position of the rolling element.

3. The rolling bearing apparatus according to claim 2, wherein the contact center point is situated closer to the vehicle outer side than an intersection point where a straight line extending radially outwards from the center position of the rolling element intersects the raceway surface.

4. The rolling bearing apparatus according to claim 2, wherein the contact center point is disposed on the vehicle outer side of an axial center of the rolling elements.

5. The rolling bearing apparatus according to claim 2, wherein the straight contact line extends toward the vehicle outer side as the straight contact line extends radially outward.

6. The rolling bearing apparatus according to claim 2, wherein the straight contact line intersects the protruding curved surface.

7. The rolling bearing apparatus according to claim 1, wherein the curved surface is provided in a position where the curved surface overlaps with the raceway surface of the outer ring main body portion on a projection plane on which the curved surface and the raceway surface of the outer ring main body are projected in a radial direction.

8. The rolling bearing apparatus according to claim 1, further comprising an other rolling element row comprising rolling elements arranged in the circumferential direction on an other raceway surface between the inner ring member and the outer ring member and located on the vehicle outer side of the rolling elements.

9. The rolling bearing apparatus according to claim 8, wherein the vehicle outer side end face is disposed axially between planes extending perpendicular to an axial direction of the outer ring through a center of the rolling elements of the rolling element row and a center of the rolling elements of the other rolling element row.

* * * * *